United States Patent
Takano et al.

[11] Patent Number: 5,936,328
[45] Date of Patent: Aug. 10, 1999

[54] LINEAR VIBRATION ACTUATOR UTILIZING COMBINED BENDING AND LONGITUDINAL VIBRATION MODES

[75] Inventors: Hironori Takano, Yokohama; Masami Sugimori, Yamato, both of Japan

[73] Assignee: Canon Kabushiki Kaisha, Tokyo, Japan

[21] Appl. No.: 08/845,215

[22] Filed: Apr. 21, 1997

Related U.S. Application Data

[62] Division of application No. 08/577,473, Dec. 22, 1995, Pat. No. 5,665,918.

[30] Foreign Application Priority Data

Dec. 26, 1994 [JP] Japan .................................. 6-322418
Jan. 9, 1995 [JP] Japan .................................. 7-001207

[51] Int. Cl.$^6$ .................................................. H01L 41/08
[52] U.S. Cl. ...................................................... 310/323.02
[58] Field of Search ............................... 310/323, 316

[56] References Cited

U.S. PATENT DOCUMENTS

| | | | |
|---|---|---|---|
| 3,004,176 | 10/1961 | Mason et al. ........................ | 310/9.1 |
| 4,752,711 | 6/1988 | Tsukimoto et al. ................... | 310/323 |
| 5,073,739 | 12/1991 | Iijima et al. ........................... | 310/323 |
| 5,191,688 | 3/1993 | Takizawa et al. ..................... | 310/323 |
| 5,200,665 | 4/1993 | Iijima ................................... | 310/323 |
| 5,416,375 | 5/1995 | Funakubo et al. ..................... | 310/323 |
| 5,442,251 | 8/1995 | Kaida et al. ........................... | 310/321 |
| 5,672,930 | 9/1997 | Narisawa et al. ..................... | 310/323 |

FOREIGN PATENT DOCUMENTS

| | | |
|---|---|---|
| 63-290176 | 11/1988 | Japan . |
| 63-294269 | 11/1988 | Japan . |
| 1-110070 | 4/1989 | Japan . |
| 1-110071 | 4/1989 | Japan . |

*Primary Examiner*—Mark O. Budd
*Attorney, Agent, or Firm*—Fitzpatrick, Cella, Harper & Scinto

[57] ABSTRACT

A vibration driven actuator includes a vibration member for causing an electro-mechanical energy conversion element to excite bending and longitudinal vibrations, and producing a driving force by using specific vibrations obtained by synthesizing the bending and longitudinal vibrations, and a projection portion formed at a position, on at least one of the energy conversion element and the vibration member, which corresponds to a node of the bending vibrations. The projection portion is used for supplying a signal to the energy conversion element.

12 Claims, 12 Drawing Sheets

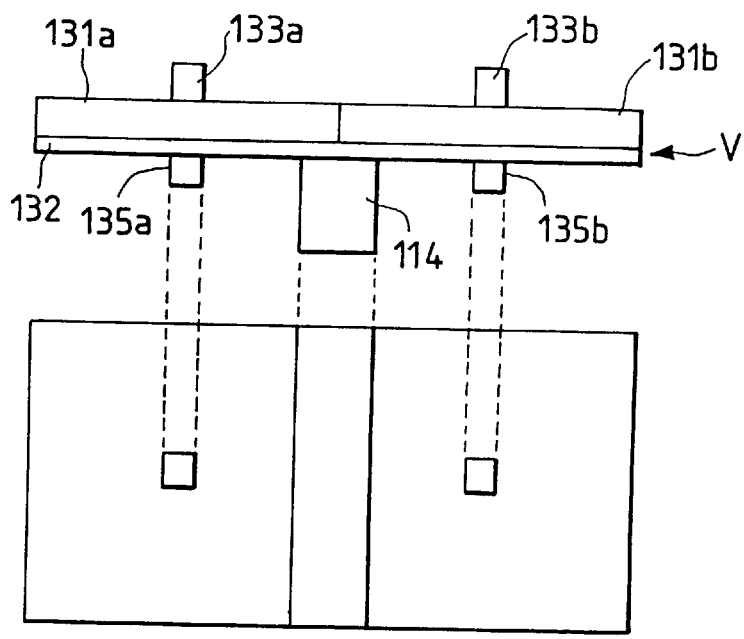
FIG. 10A
FIG. 10B
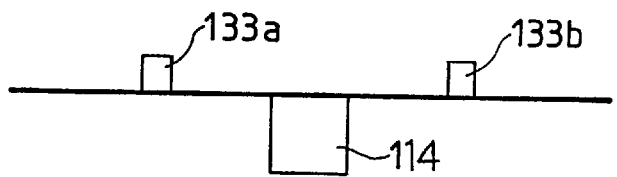
FIG. 11A
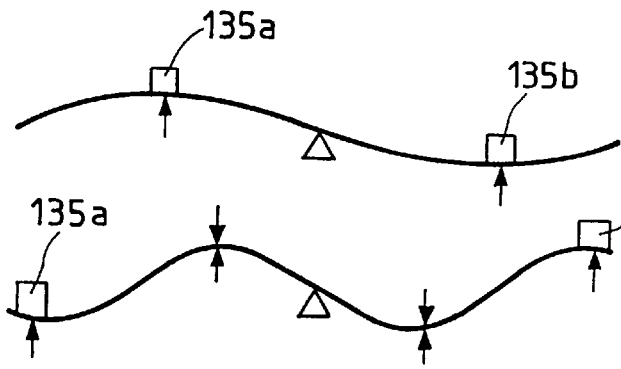
FIG. 11B
FIG. 11C
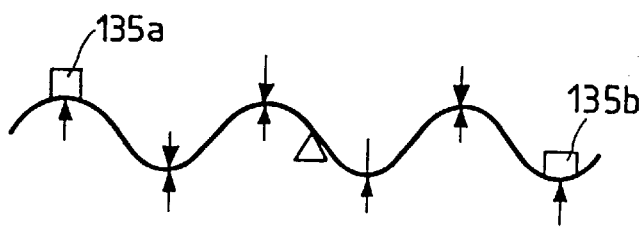
FIG. 11D

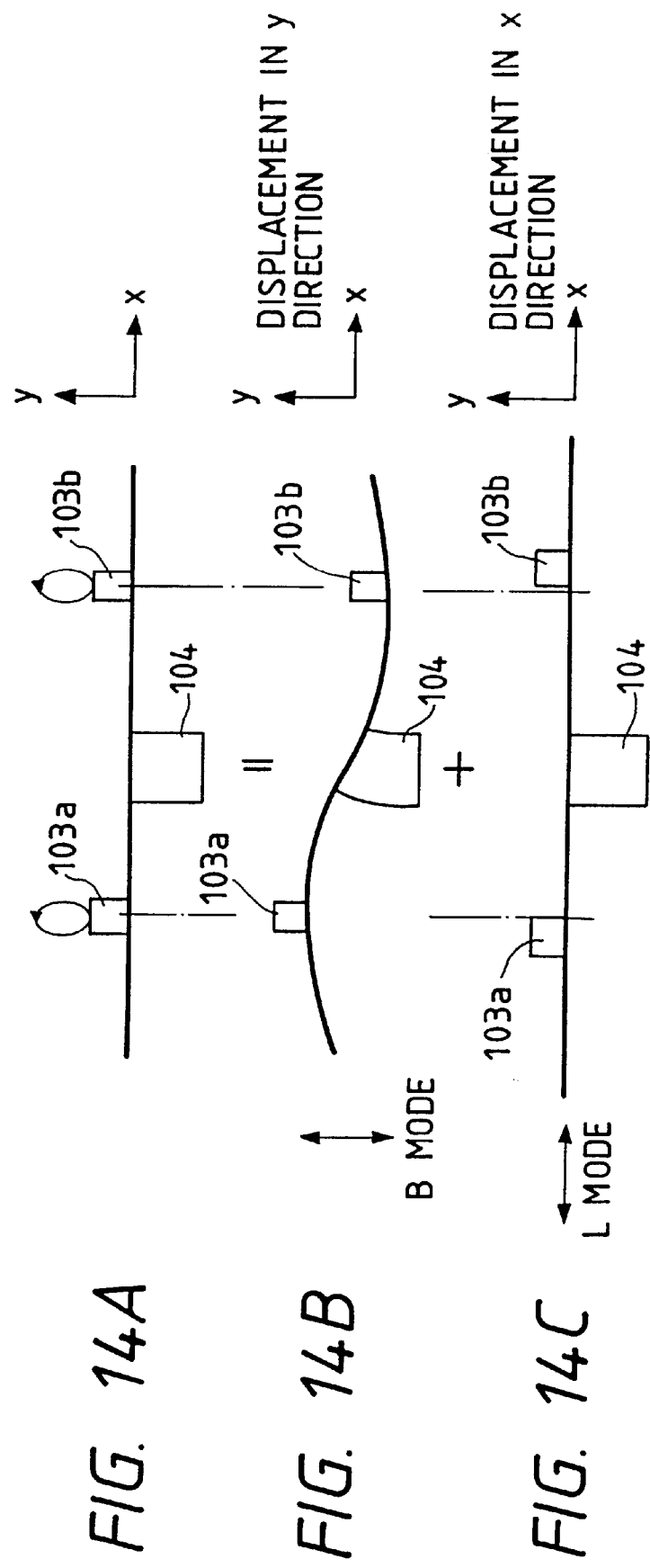

LINEAR VIBRATION ACTUATOR UTILIZING COMBINED BENDING AND LONGITUDINAL VIBRATION MODES

This application is a divisional of application Ser. No. 08/577,473 filed Dec. 22, 1995 now U.S. Pat. No. 5,665,918.

BACKGROUND OF THE INVENTION

1. Field of the Invention

The present invention relates to a vibration actuator which obtains a driving force from vibration waves.

2. Related Background Art

As an ultrasonic motor using ultrasonic vibrations, a standing wave type linear ultrasonic monitor using standing waves produced by an elastic vibration member has been proposed. In this motor, voltages having a specific frequency are applied to a vibrator bonded to the elastic vibration member to excite bending vibrations and longitudinal vibrations in the elastic vibration member, and a driving force is obtained through a motion extraction portion disposed on the elastic vibration member.

The driving principle of the standing wave type linear ultrasonic monitor will be described next with reference to FIGS. 6A and 6B.

Referring to FIGS. 6A and 6B, this motor includes a movable member 51, a vibration member 52 made of an elastic member, motion extraction portions 52a and 52b integrally formed with the elastic vibration member 52, a piezoelectric member 53 for exciting longitudinal vibrations and bending vibrations in the elastic vibration member 52, and electrode films 53a, 53b, and 53c through which voltages having a specific frequency are applied to the piezoelectric member 53. The elastic vibration member 52 and the piezoelectric member 53 are integrally formed by an adhesive etc., and thereby a vibration element is formed. Note that a voltage application circuit is not shown.

In the above arrangement, when voltages having a specific frequency and a 90° phase difference are respectively applied to the electrode films 53a and 53b, the piezoelectric member 53 repeats expansion-shrinkage at the specific frequency. Upon expansion-shrinkage of the piezoelectric member 53, longitudinal vibrations and bending vibrations are excited in the elastic vibration member 52, and the motion extraction portions 52a and 52b rotate in the same direction to perform elliptic motions. When the movable member 51 is pressed against the motion extraction portions 52a and 52b, the movable member 51 moves in, e.g., the direction indicated by the arrow in FIG. 6A.

Referring to FIG. 6A, the bending vibrations are of the fourth-order mode, and the longitudinal vibrations are of the first-order mode. However, vibration modes to be used are not limited to these modes as long as a driving force can be obtained.

In the above prior art, since leads for voltage application are directly soldered to a surface of a piezoelectric member, it is difficult to laminate piezoelectric members because of a connection structure formed by soldering. In addition, it is difficult to decrease the driving voltage or increase the driving force by increasing the amplitudes of elliptic motions using a laminated structure.

Various forms of ultrasonic monitors have been proposed from the viewpoint of vibration elements for producing vibrations. FIGS. 13A and 13B show an ultrasonic motor having a vibration element V in the form of a flat plate, which is disclosed in, e.g., Japanese Laid-Open Patent Application Nos. 63-290176, 63-294269, 1-110070, and 1-110071.

This vibration element V is designed such that bending vibrations of the B mode in FIG. 14B and longitudinal vibrations of the L mode in FIG. 14C are synthesized to cause driving pieces 103a and 103b disposed at the positions of antinodes of bending vibrations of the B mode to perform elliptic motions as shown in FIG. 14A.

The vibration element V is disposed between an upper wall 109 and a lower wall 110. Roller bars 106a 106b respectively having rollers 108a and 108b on their lower ends extend from the upper wall 109.

A support member 104 of the vibration element V is fitted in a hole portion in the lower wall 110. The vibration element V is elastically supported by a spring 107 disposed in the hole portion. The upward movement of the vibration element V is restricted by the rollers 108a and 108b. The driving pieces 103a and 103b of the vibration element V are pressed against a movable member 105 which is allowed to move in the x direction. The movable member 105 is moved in the x direction by a frictional driving force produced by elliptic motions of the driving pieces 103a and 103b.

As shown in FIG. 13B, in the vibration element V for producing vibrations of the B and L modes, pairs of driving piezoelectric elements 101a and 101b, and 101c and 101d which respectively constitute vibrators are respectively bonded to the upper and lower surfaces of a ground electrode plate 102 in the form of a rectangular, flat plate. As shown in FIG. 15A, these driving piezoelectric elements 101a, 101b, 101c, and 101d are polarized in the direction of thickness. The polarization directions are indicated by the arrows in FIG. 15A.

As shown in FIG. 15A, a B input is applied to the driving piezoelectric elements 101a and 101d, which are polarized in the direction of thickness, and an A input as an electric field having a reverse polarity to the B input is applied to the driving piezoelectric elements 101b and 101c. As a result, as shown in FIG. 15B, for example, the driving piezoelectric elements 101a and 101d, to which the B input as an electric field is applied, expand, and the driving piezoelectric elements 101b and 101c, to which the A input as an electric field is applied, shrink. When this expansion-shrinkage is repeated, bending vibrations of the B mode are produced.

When electric fields having the same polarity are applied to all the driving piezoelectric elements 101a, 101b, 101c, and 101d in FIG. 15A, they expand/shrink, as shown in FIG. 15C or 15D, thereby producing longitudinal vibrations of the L mode.

If the two vibration modes, i.e., the B and L modes, of the vibration element V have almost equal resonant frequencies, both the vibration modes are simultaneously produced by exciting the vibrators at the resonance frequency. As shown in FIG. 16, when sin and cos waves having a 90° phase difference are applied, as the A and B inputs, to the driving piezoelectric elements to shift the phase of vibrations of the B mode from that of the A mode by 90°, the driving pieces perform elliptic motions. By bringing the driving pieces into frictional contact with the movable member, the movable member can be driven. Referring to FIG. 16, "○" indicates shrinkage; "●", expansion; "◊", bending; and "♦", bending.

In the above conventional vibration device, actual measurement of vibrations of the vibration element V is the only way to determine whether the movable member 105 is properly driven, i.e., whether vibrations of the B and L modes are properly produced. In spite of the fact that the torque and efficiency of an ultrasonic monitor greatly change depending on a frequency to be input, frequency control for optimal characteristics is performed for each operation by experimentally changing the frequency.

Vibrations of the B and L modes are produced at resonant frequencies as values (first-order, second-order, third-order, . . . ) based on the natural frequencies of the vibrators in the respective modes. However, resonance points shift depending on environmental conditions such as temperature and humidity, so that the same driving force cannot be obtained from vibrations produced at the same frequency.

SUMMARY OF THE INVENTION

According to one aspect of the invention, there is provided a vibration actuator which is designed to cause a vibration member to produce bending and longitudinal vibrations so as to obtain a driving force from standing waves, and has projection portions for signal application at positions corresponding to nodes of the bending or longitudinal vibrations. It is an object of the present invention to provide a structure which facilitates connection for signal application.

The above and other objects, features, and advantages of the present invention will be apparent from the following detailed description in conjunction with the accompanying drawings and the appended claims.

BRIEF DESCRIPTION OF THE DRAWINGS

FIGS. 10A and 10B show the fourth embodiment of the present invention, in which FIG. 10A is a side view of a vibration element, and FIG. 10B is a bottom view showing the lower surface of the vibration element in FIG. 10A;

FIGS. 11A to 11D show the relationship between the vibration element in FIG. 10 and standing waves, in which FIG. 11A is a side view of the vibration element, FIG. 11B is a chart showing the waveform of a one-pulse standing wave and the positions of piezoelectric elements for detecting vibrations, FIG. 11C is a chart showing the waveform of a two-pulse standing wave and the positions of the piezoelectric elements for detecting vibrations, and FIG. 11D is a chart showing the waveform of a three-pulse standing wave and the positions of the piezoelectric elements for detecting vibrations:

FIGS. 12A and 12B show the fifth embodiment of the present invention, in which FIG. 12A is a side view of a vibration element, and FIG. 12B is a bottom view showing the lower surface of the vibration element in FIG. 12A;

FIGS. 13A and 13B show a conventional ultrasonic motor, in which FIG. 13A is a side view of the motor, and FIG. 13B is a perspective view of a vibration element in FIG. 13A;

FIGS. 14A to 14C show the driving principle of the vibration element in FIGS. 13A and 13B, in which FIG. 14A is a side view of the vibration element, FIG. 14B is a chart showing the waveform of a standing wave of the M mode, and FIG. 14C is a chart showing the waveform of a standing wave of the L mode;

DETAILED DESCRIPTION OF THE PREFERRED EMBODIMENTS (First Embodiment)

The first embodiment will be described below with reference to the accompanying drawings.

Figure 1A:
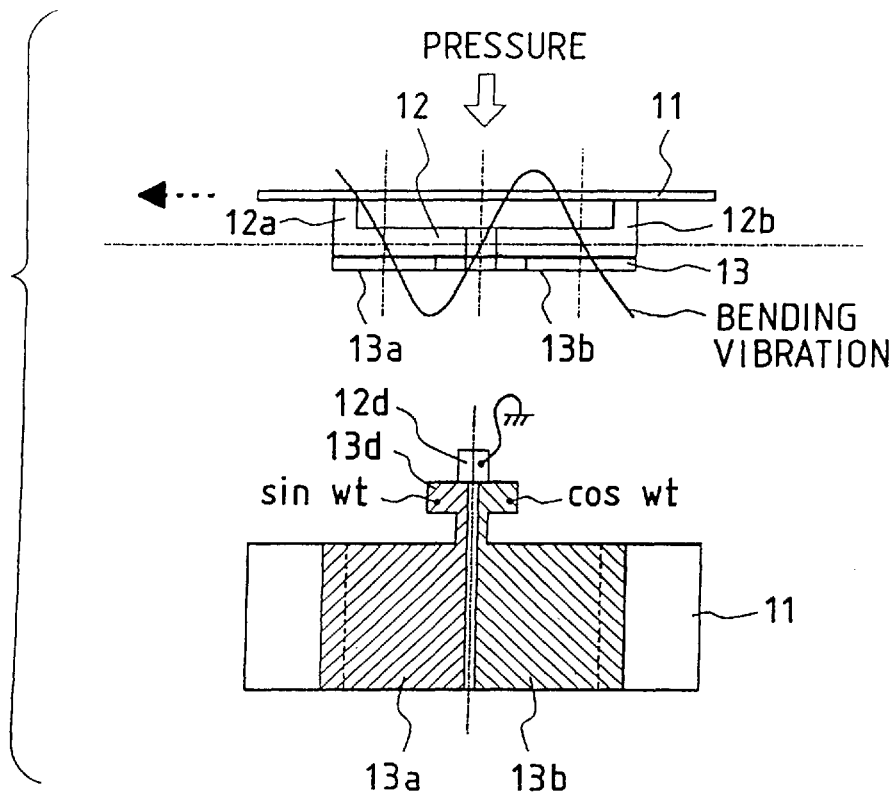
FIGS. 1A and 1B are views showing the first embodiment of the present invention.
Figure 1B:
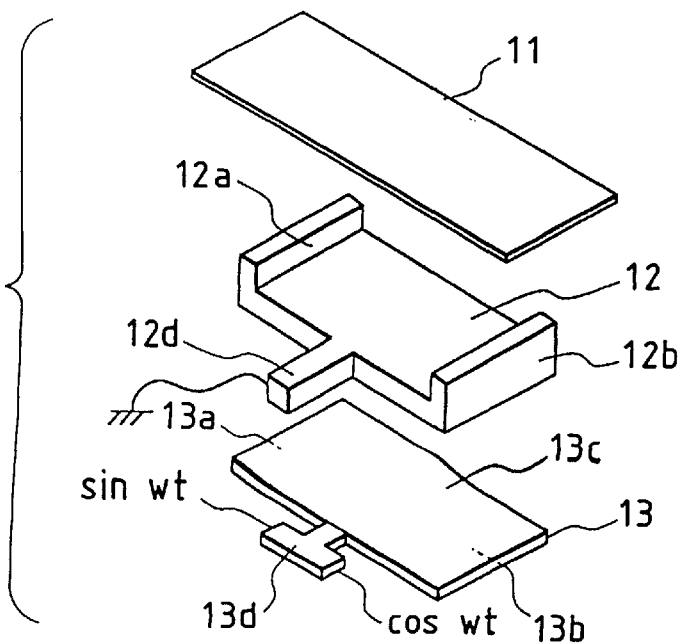

FIGS. 1A and 1B are views showing the characteristics of the first embodiment most clearly. Referring to FIGS. 1A and 1B, the embodiment includes a movable member 11, a vibration member 12 made of an elastic member, motion extraction portions 12a and 12b protruding from the vibration member 12 and serving as transfer portions, which are integrally formed with the vibration member 12 or fixed thereto with an epoxy adhesive or the like, a piezoelectric element 13 mounted on the vibration member 12 and serving as a vibrator (electromechanical conversion element) for exciting longitudinal and bending vibrations, and electrode films 13a and 13b which are formed on a surface of the piezoelectric element 13 and through which voltages having a specific frequency are applied. Assume that the above specific frequency is near or equal to the resonant frequency of the elastic vibration member.

The vibration member 12 has a projection portion 12d at the middle position in the longitudinal direction which corresponds to nodes of longitudinal and bending vibrations. The piezoelectric element 13 has a T-shaped projection portion 13d at a position corresponding to nodes of longitudinal and bending vibrations produced at the middle position in the longitudinal direction of the vibration member 12.

As is apparent from FIG. 1A, the projection amount of the projection portion 12d is slightly larger than that of the projection portion 13d.

Figure 2A:
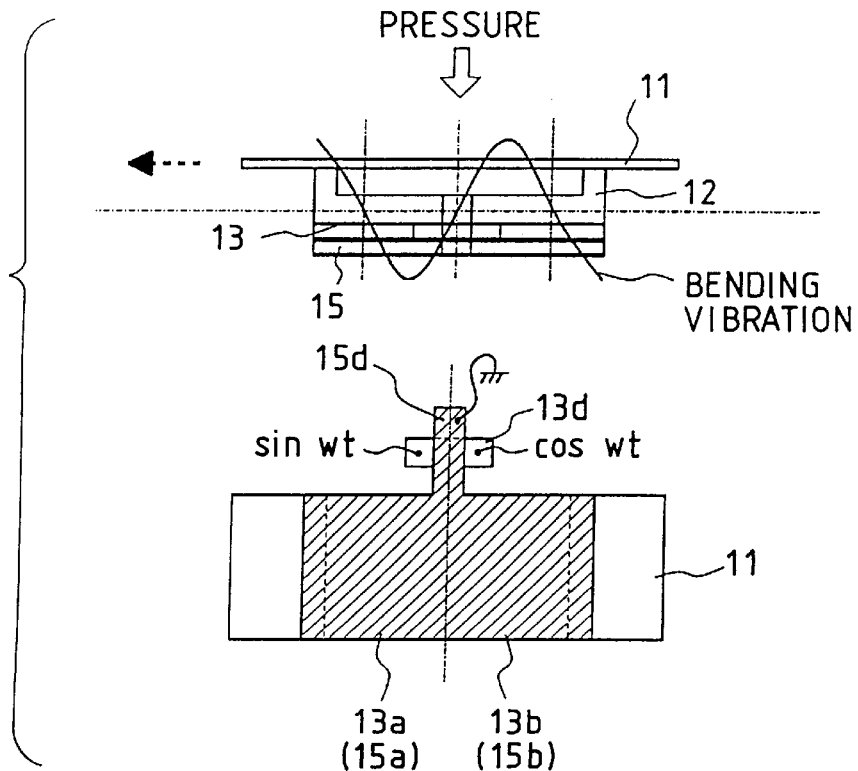
FIGS. 2A and 2B are views showing a case wherein a piezoelectric member has a laminated structure in the first embodiment.
Figure 2B:
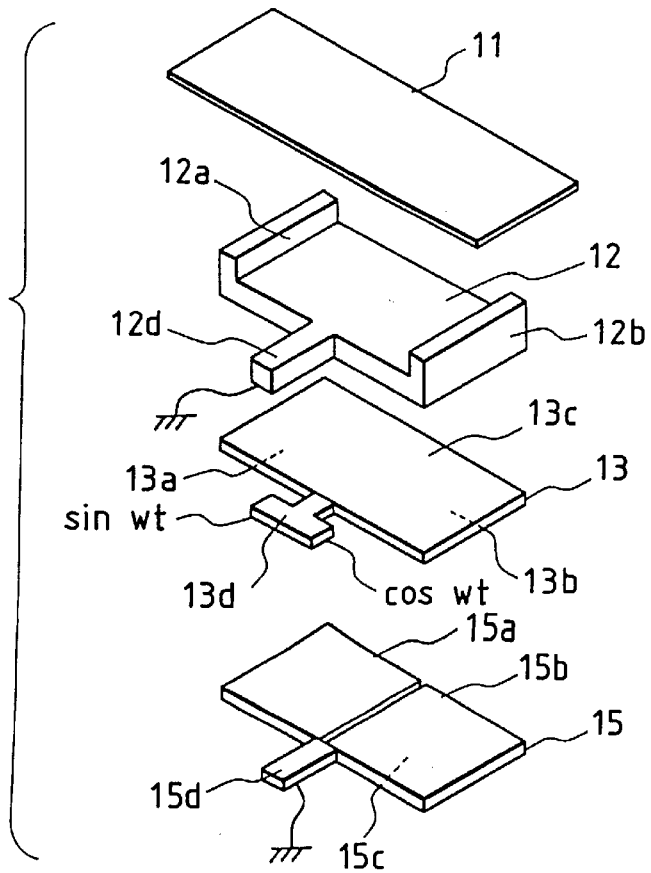

FIGS. 2A and 2B show a case wherein two piezoelectric elements each identical to the one shown in FIGS. 1A and 1B are stacked on each other to form a laminated structure. Referring to FIGS. 2A and 2B, a piezoelectric element 15 is identical to the piezoelectric element 13, and electrode films 15a, 15b, and 15c are formed on the upper and lower surfaces of the piezoelectric element 15 to allow application of voltages having a specific frequency, similar to the electrode films 13a, 13b, and 13c. The piezoelectric element 15 has a projection portion 15d at the middle position in the longitudinal direction. The electrode film 15c is formed on one surface of the projection portion 15d up to its distal end.

When voltages having a 90° phase difference, e.g., voltages represented by sin wt and cos wt, are applied to the electrode films shown in FIGS. 1A and 1B or 2A and 2B, the piezoelectric elements 13 and 15 repeatedly expand and shrink. With this operation, longitudinal and bending vibrations are excited in the vibration member 12, and the motion extraction portions 12a and 12b rotate in the same direction to perform elliptic motions, thereby driving the movable member 11 in the direction indicated by the arrow in FIG. 2A.

Figure 3A:
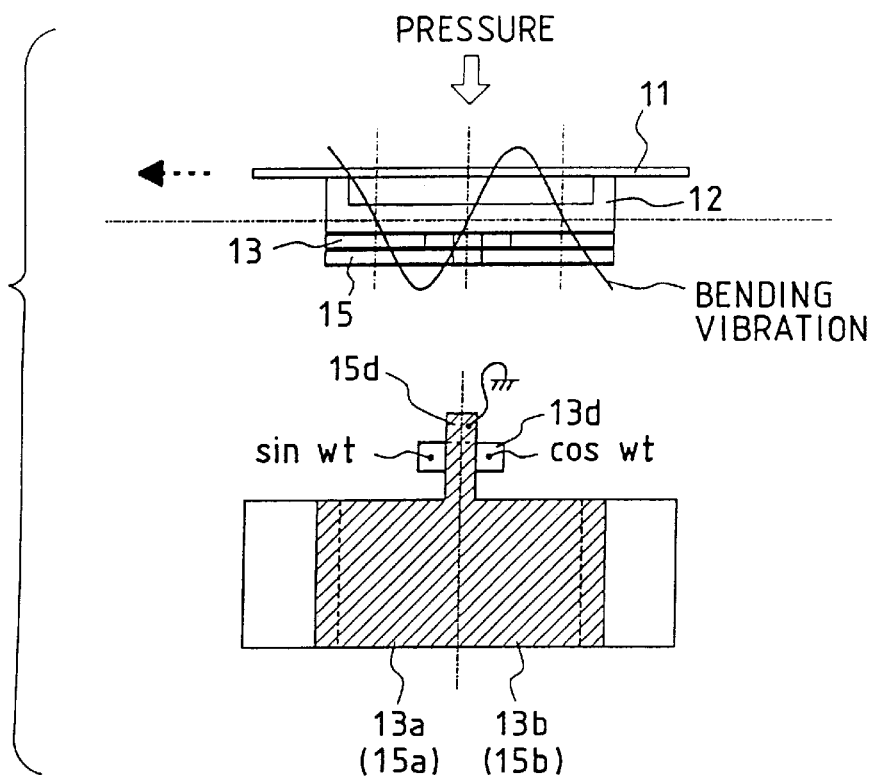
FIGS. 3A and 3B are views showing a case wherein a projection portion for voltage application is formed on only a piezoelectric member in the first embodiment.
Figure 3B:
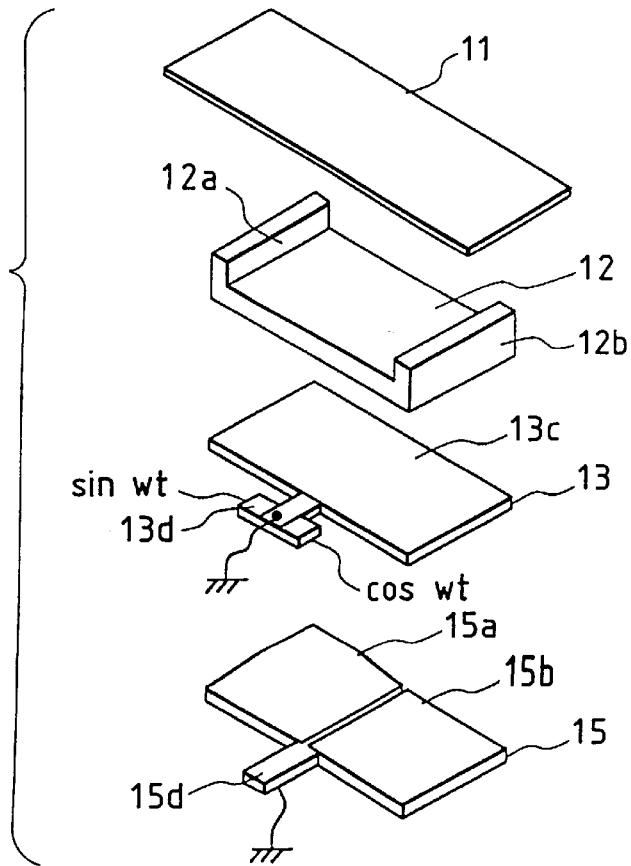

FIG. 3A and 3B show an embodiment in which no projection portion is formed on the elastic vibration member, and the electrode film 13c is formed up to the distal end of the projection portion 13d. With this arrangement as well, the present invention can be executed.

(Second Embodiment)

The second embodiment will be described with reference to the accompanying drawings.

Figure 4A:
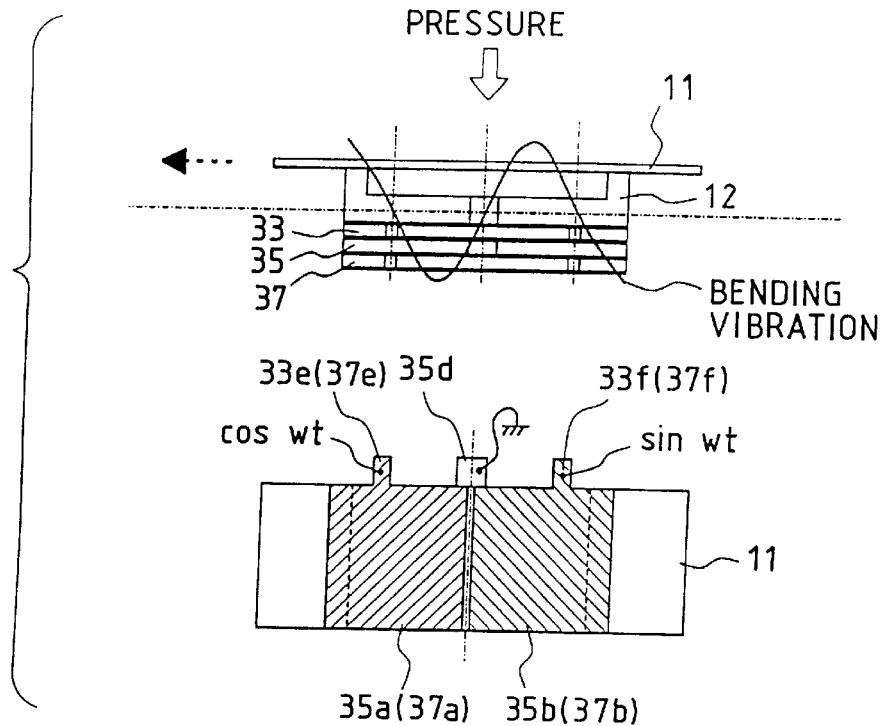
FIGS. 4A and 4B are views showing the second embodiment of the present invention.
Figure 4B:
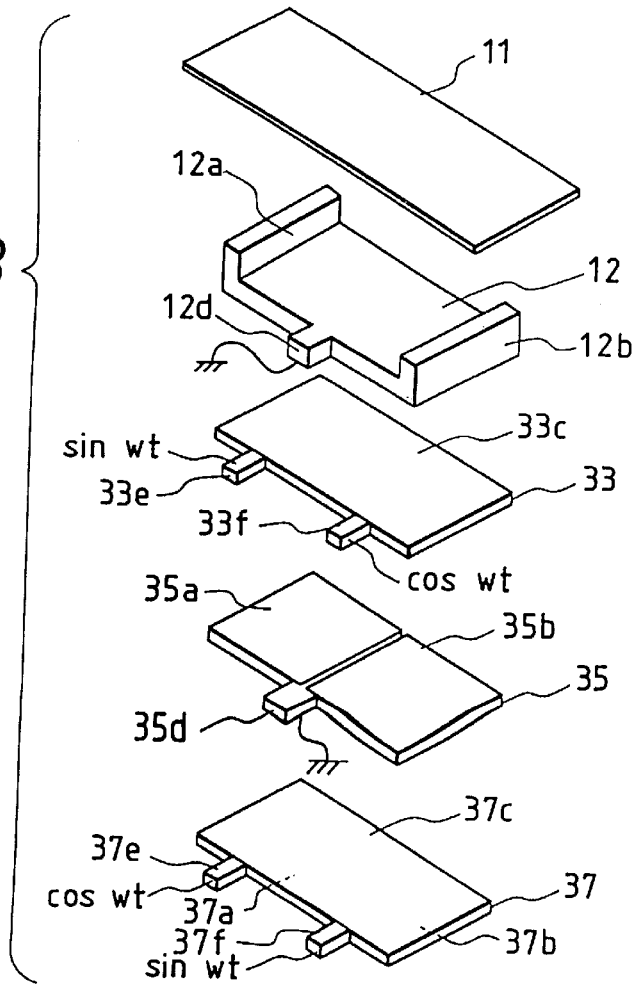

FIGS. 4A and 4B show the characteristics of the second embodiment most clearly. The same reference numerals in FIGS. 4A and 4B denote the same parts as in the first embodiment, and a description thereof will be omitted.

FIGS. 4A and 4B show an arrangement in which three piezoelectric elements are laminated. This arrangement includes piezoelectric elements 33, 35, and 37 each having electrode layers on its upper and lower surfaces. Each piezoelectric element has projection portions for voltage application at positions corresponding to nodes of bending vibrations produced by the vibration member 12. More specifically, the piezoelectric element 33 has two projection portions 33e and 33f at positions corresponding to nodes of bending vibrations produced at left and right positions symmetrical about the longitudinal axial center of the vibration member 12. Voltages having a specific frequency and a 90° phase difference are respectively applied to the projection portions 33e and 33f. The piezoelectric element 35 has a projection portion 35d at a position corresponding to a node of bending vibrations produced at the longitudinal axial center of the vibration member 12. A reference voltage, e.g., a ground potential, is applied to the projection portion 35d.

Similar to the piezoelectric element 33, the piezoelectric element 37 has two projection portions 37e and 37f at positions corresponding to nodes of bending vibrations produced at left and right positions symmetrical about the longitudinal axial center of the vibration member 12. As described above, voltages having a specific frequency and a 90° phase difference are respectively applied to these projection portions 37e and 37f.

Figure 5A:
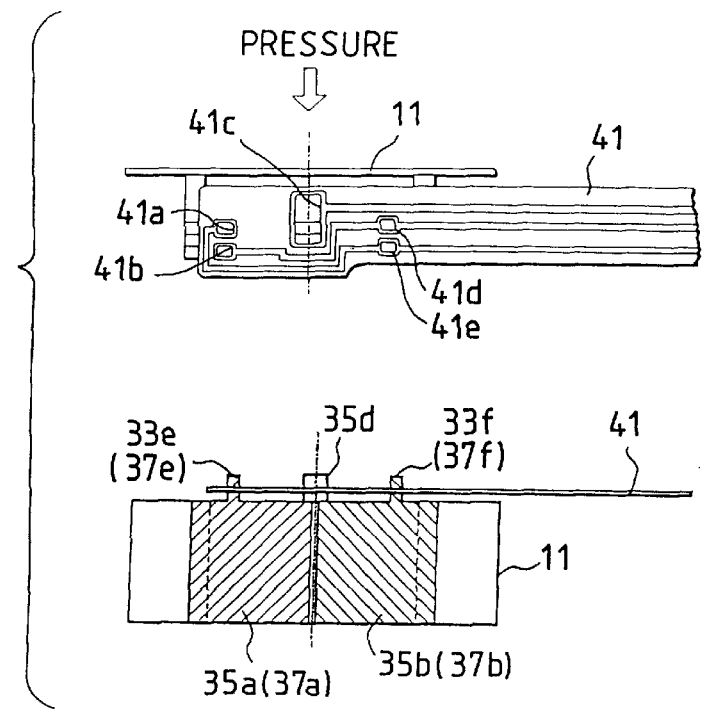
FIGS. 5A and 5B are views showing a case wherein a flexible printed board is used in the second embodiment.
Figure 5B:
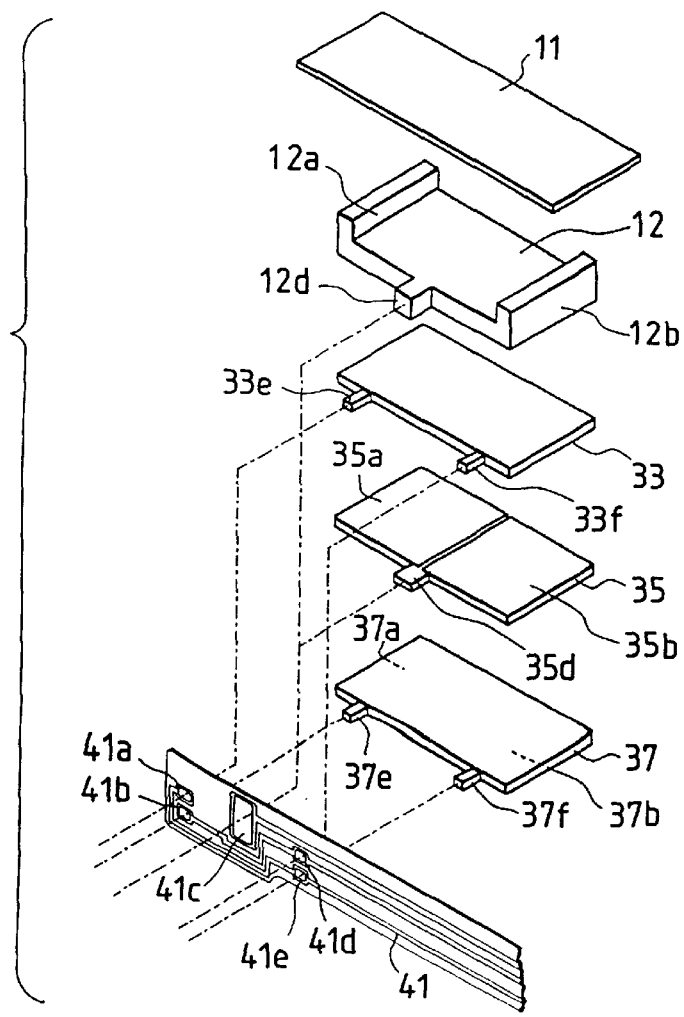
Figure 6A:
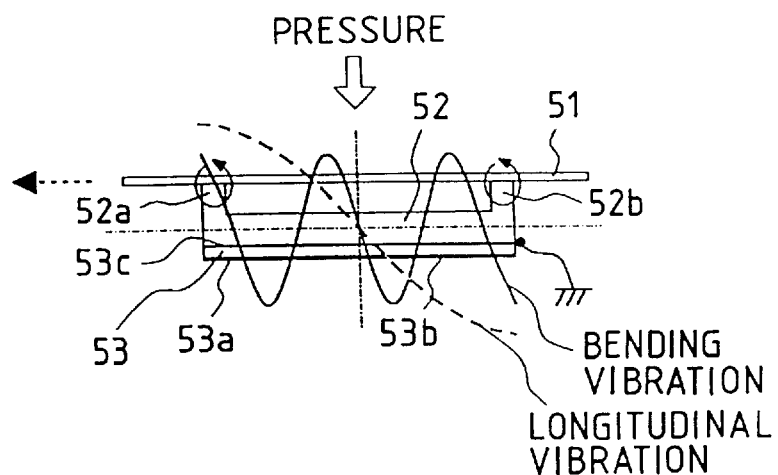
FIGS. 6A and 6B are views for explaining a principle of vibration.
Figure 6B:
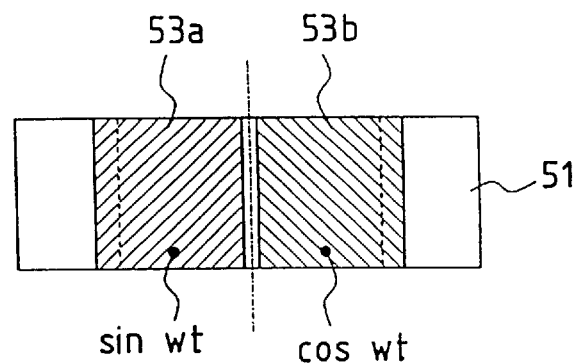

FIGS. 5A and 5B show an arrangement for applying voltages through leads by using a flexible printed board 41 according to the second embodiment. Holes 41a to 41e are formed in the flexible printed board 41 to allow insertion of a projection portion 12d and the projection portions 33e, 33f, 35d, 37e, and 37f. A connection lead is formed on the periphery of each hole.

Referring to FIGS. 1A to 5B showing the embodiments, projection portions are formed on one side surface of an elastic vibration member or a piezoelectric element. However, projection portions may be formed on both side surfaces depending on the pattern of electrode films.

As in the case shown in FIGS. 3A and 3B according to the first embodiment, in the second embodiment, an electrode film 33c may be formed up to the distal ends of the projection portions 33e and 33f on the piezoelectric element 33, instead of forming a projection portion on the vibration member 12, to allow application of voltages.

In this embodiment, bending vibrations are of the second-order mode. However, a vibration mode to be used is not limited to this as long as a driving force can be obtained.

In the embodiment, the projection portions are formed on the elastic vibration member and the piezoelectric elements. However, an electrode plate may be integrally formed with each piezoelectric element. The formation of electrode plates is essentially equivalent to the formation of projections on the piezoelectric elements.

As described above, according to the above embodiment, since a projection portion for allowing application of a voltage to a piezoelectric element is formed at a position, on a vibration member or the piezoelectric element, which corresponds to a node of bending vibrations and/or longitudinal vibration, a connection position is made clear without adversely affecting the vibration modes, thereby improving workability.

In addition, according to the embodiment, since projection portions for allowing application of voltages to a piezoelectric element are formed at positions, on a vibration member and the piezoelectric element, which correspond to nodes of bending vibrations and/or longitudinal vibrations, connection positions are made clear without adversely affecting the vibration modes, thereby improving workability.

Furthermore, according to the embodiment, in addition to the above arrangement, a plurality of piezoelectric elements are laminated, and the above projection portions are formed at side surface positions on the elements. With this arrangement, an increase in driving force can be attained by increasing an amplitude without increasing the driving voltage.

Moreover, according to the embodiment, since the plurality of projection portions are formed at positions where they overlap each other, workability in connection can be improved.

(Third Embodiment)

FIGS. 7, 8A, 8B and 8C show the third embodiment of the present invention.

Figure 7:
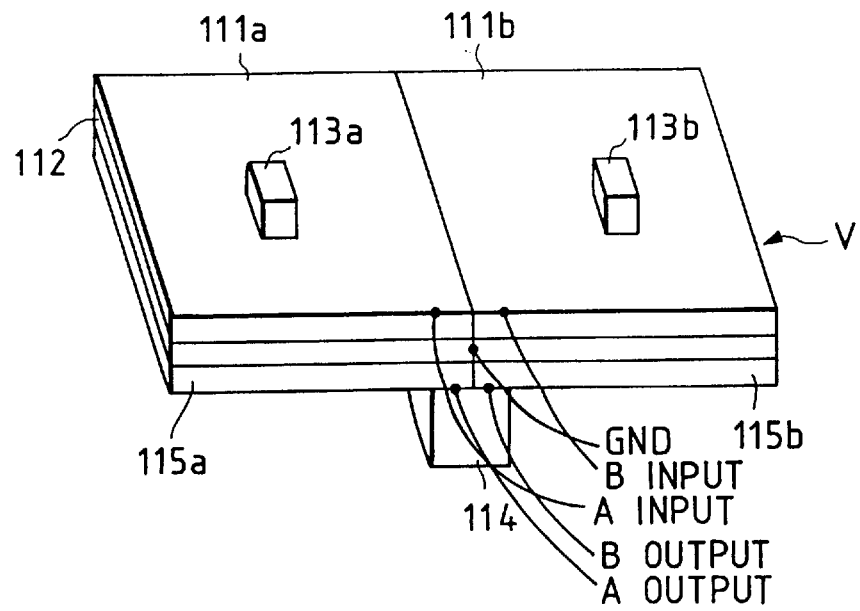
FIG. 7 is a perspective view showing a vibration element of a vibration unit according to the third embodiment of the present invention.

FIG. 7 is a perspective view showing a vibration member in the form of a rectangular, flat plate, which is constituted by a vibration member 112, piezoelectric elements 111a, 111b, 115a, and 115b, driving pieces 113a and 113b, and a support member 114. The outer appearance of the vibration member, polarization processing performed for each piezoelectric element, and the polarization directions in the third embodiment are the same as those in the device shown in FIGS. 13A and 13B.

Figure 8A:
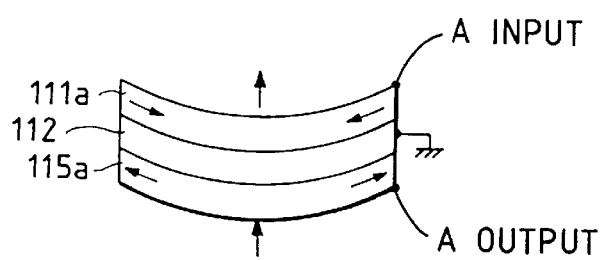
FIGS. 8A to 8C are views showing vibrations of the vibration element in FIG. 7 and a state in which vibrations are detected.
Figure 8C:
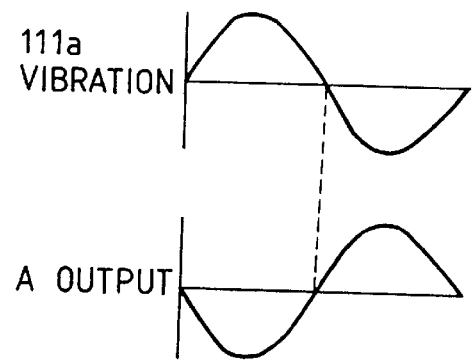
Figure 8B:
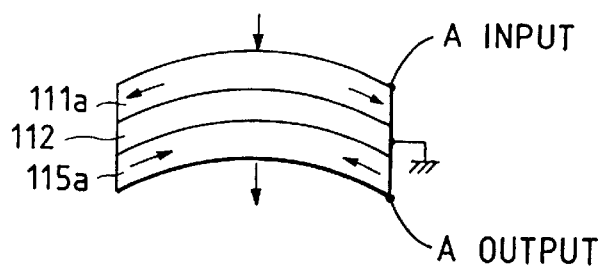
Figure 15A:
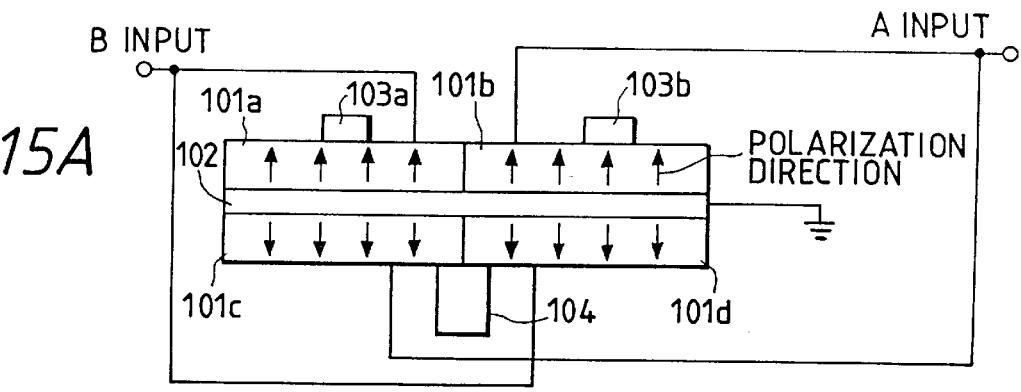
FIGS. 15A to 15D are views showing the polarization directions of piezoelectric elements and the formation principle of vibration modes.
Figure 15B:
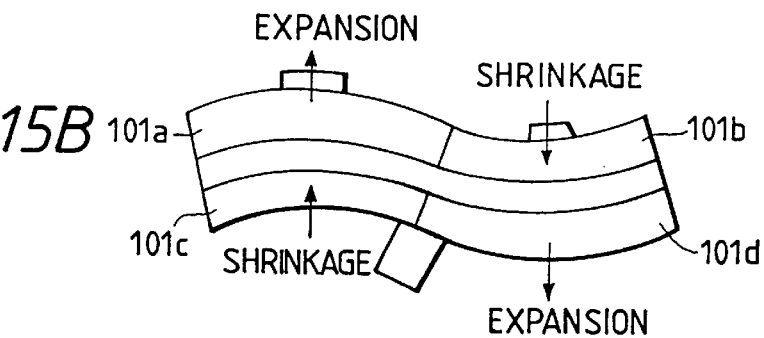
Figure 15C:
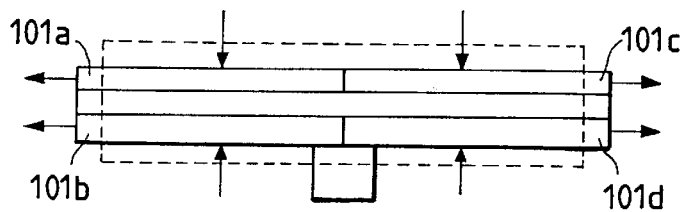
Figure 15D:
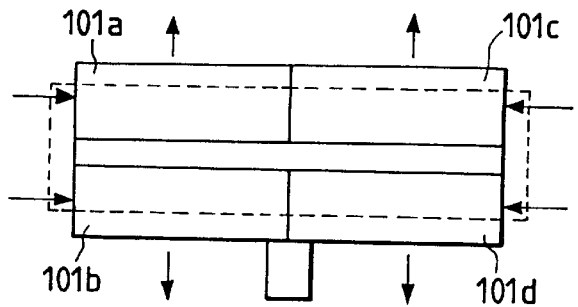
Figure 16:
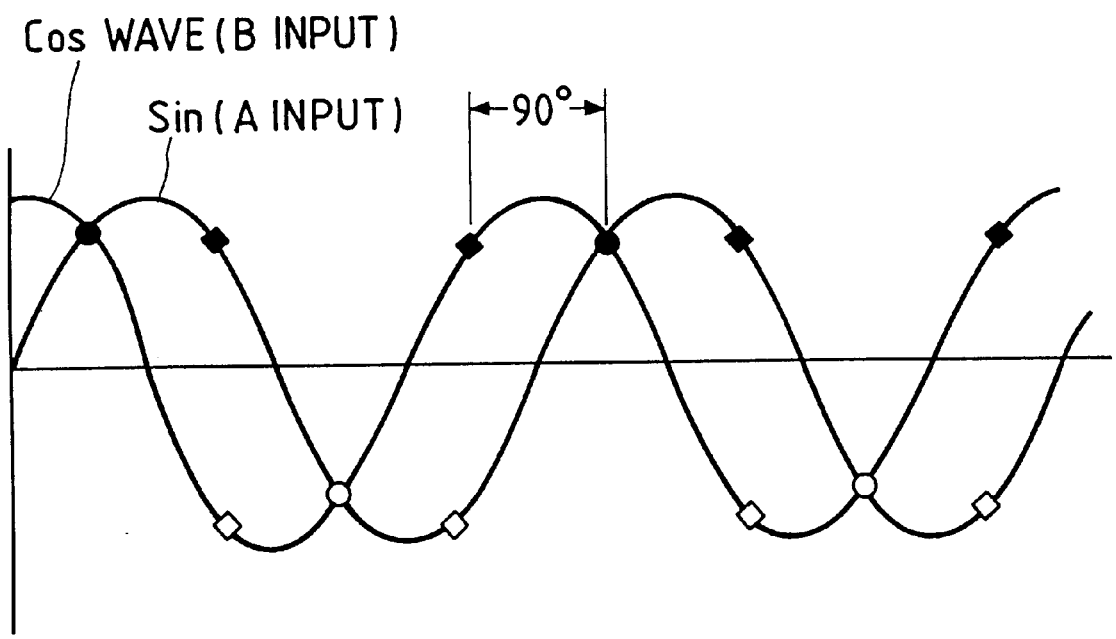
FIG. 16 is a chart showing the waveform of voltages to be applied to the vibration element in FIGS. 15A to 15D.

In this embodiment, driving signals having, e.g., sin and cos waves or rectangular waves having a 90° phase difference are applied, as A and B inputs, to one pair of piezoelectric elements 111a and 111b bonded to one surface of the vibration member 112 which also serves as a vibration member to excite bending vibrations of the B mode in FIGS. 8A and 8B and longitudinal vibrations of the L mode in FIGS. 15C and 15D.

In the conventional device shown in FIGS. 15A to 15D, all the piezoelectric elements 101a to 101d are used for driving. In this embodiment, however, the piezoelectric elements 111a and 111b on one surface are used for driving, and piezoelectric elements 111c and 111d on the other surface are used to detect the vibrated states of the driving pieces 113a and 113b.

The driving principle of the vibration member of this embodiment is the same as that of the vibration member of the conventional device shown in FIGS. 15A to 15D. When, for example, driving signals having sin and cos waves are applied, as the A and B inputs, to the pair of piezoelectric elements 111a and 111b, bending vibrations and longitudinal vibrations are simultaneously excited in the piezoelectric elements 111a and 111b.

In the vibration member of this embodiment, therefore, the driving piece 113a formed on the piezoelectric element 111a and the driving piece 113b formed on the piezoelectric element 111b perform elliptic motions, as shown in FIG. 14A. The vibration member in this embodiment is elastically supported by a spring 107 and is pressed against a movable member 105 as in the case shown in FIG. 13A.

The pair of piezoelectric elements 115a and 115b bonded to the other surface of the vibration member 112 are used to detect vibrations of the driving pieces 113a and 113b. The piezoelectric element 115a outputs the vibration state of the driving piece 113a as an output A. The piezoelectric element 115b outputs the vibration state of the driving piece 113b as an output B.

When a signal for causing the piezoelectric element 111a to expand in the direction of thickness is applied to the A input of the piezoelectric element 111a, the piezoelectric element 111a shrinks in the longitudinal direction, and an electrode plate 112 is bent, as shown in FIG. 8A. As a result, the piezoelectric element 115a for detecting vibrations is bent to expand in the longitudinal direction to cause a potential difference between the deposited electrode surfaces of the electrode plate 112 and the piezoelectric element 115a, and shrinks in the direction of thickness. When a signal for causing the piezoelectric element 111a to shrink in the direction of thickness is applied to the A input of the piezoelectric element 111a, the piezoelectric element 111a expands in the longitudinal direction, and the electrode plate 112 is bent, as shown in FIG. 8B. As a result, the piezoelectric element 115a for detecting vibrations is bent to shrink in the longitudinal direction to cause a potential difference between the deposited electrode surfaces of the electrode plate 112 and the piezoelectric element 115a, and expands in the direction of thickness.

As a result, the vibrations of the piezoelectric element 111a and the phase of the A output signal are detected with a phase difference of 180°. Similarly, the vibrations of the piezoelectric element 111b and the phase of the B output are detected with a phase difference of 180°.

The detection signal based on the A output from the piezoelectric element 115a and the detection signal based on the B output from the piezoelectric element 115b are input, as detection signals obtained by detecting the vibrated states of the driving pieces 113a and 113b, to a driving circuit (not shown), and can be related to the actual characteristics of the motor. For example, output signals obtained when the maximum torque is obtained by changing the frequency can be stored. In addition, even if the proper frequency changes owing to the influences of temperature and humidity, since optimal driving frequencies under different environments can be known, optimal driving can be performed. Furthermore, optimal frequency control can be performed by referring to stored data such as frequency/torque characteristics, temperature/frequency characteristics, and humidity/frequency characteristics.

(Fourth Embodiment)

FIGS. 10A and 10B show the fourth embodiment of the present invention.

Figure 9:
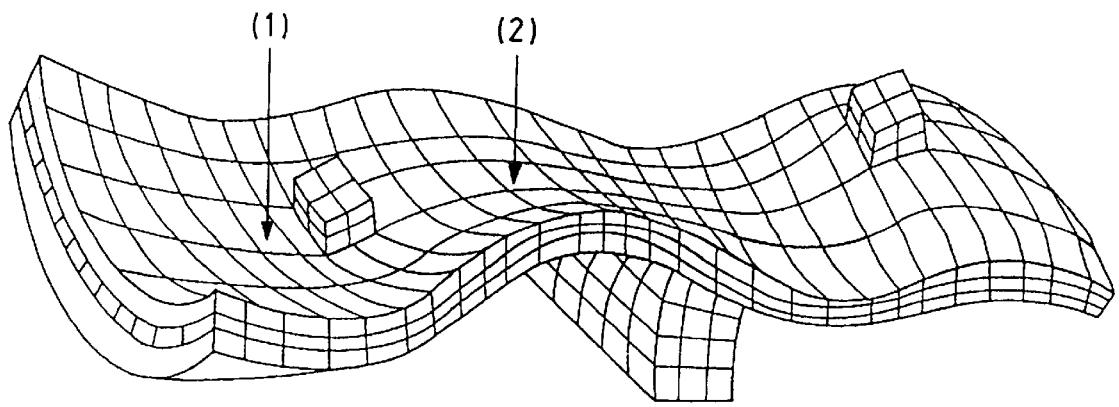
FIG. 9 is a perspective view showing a vibration state of the vibration element in FIG. 7.

In the third embodiment, the entire vibration member does not always expand or shrink as shown in FIGS. 8A and 8B. As shown FIG. 9, the vibration member is driven in the bending mode such that expansion (1) and shrinkage (2) are present in one piezoelectric element. For this reason, signals containing components in vibration modes other than the vibration mode of vibrations produced by driving pieces 133a and 133b are detected by piezoelectric elements 115a and 115b.

For this reason, in this embodiment, as shown in FIGS. 10A and 10B, vibration detecting piezoelectric elements 135a and 135b having substantially the same areas as those of the driving pieces 133a and 133b are disposed on the other surface of a ground electrode plate 132 which opposes the driving pieces 133a and 133b at the same positions as those thereof.

That is, in the fourth embodiment, the piezoelectric elements 135a and 135b are formed to have substantially the same areas as those of the driving pieces 133a and 133b. Since the signal output levels of the vibration detecting piezoelectric elements 135a an 135b are proportional to the areas of the piezoelectric elements, the levels are lower than those in the third embodiment. However, only the vibration states of the driving pieces 133a and 133b can be accurately detected.

As shown in FIGS. 11C and 11D, even if the vibration detecting piezoelectric elements 135a and 135b are disposed at positions corresponding to integer multiples of ½ the wavelength of standing waves of the B mode with respect to the positions of the driving pieces, since the piezoelectric elements 135a and 135b are present at positions corresponding to nodes or antinodes of the B mode, the same effects as those described above can be obtained. In this case, detection signals having the same phases as or opposite phases to those of driving signals for piezoelectric elements 131a and 131b.

(Fifth Embodiment)

Figure 12A:
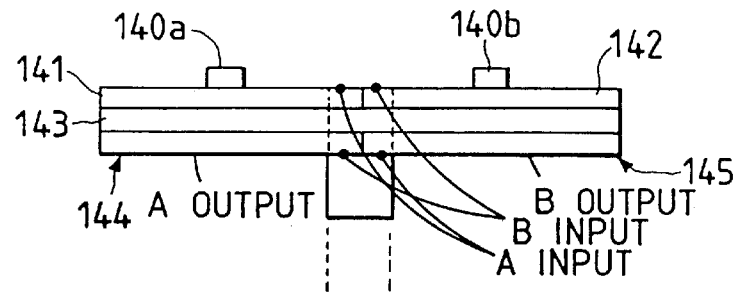
Figure 12B:
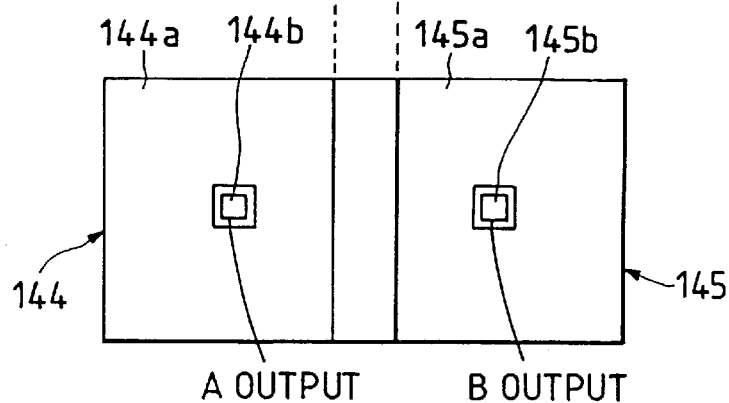

FIGS. 12A and 12B show the fifth embodiment.

Figure 13A:
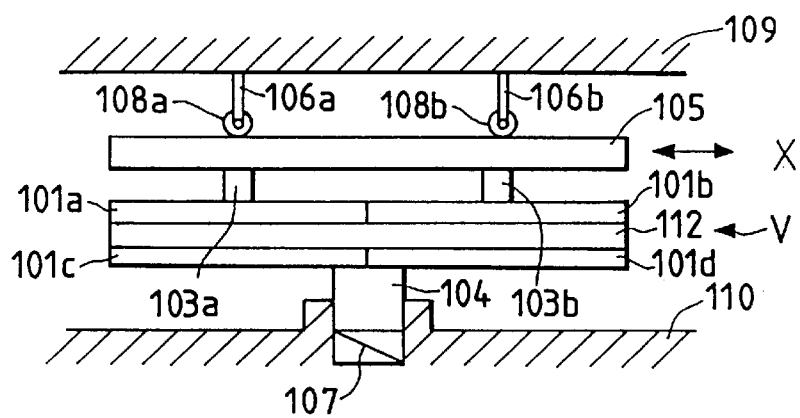
Figure 13B:
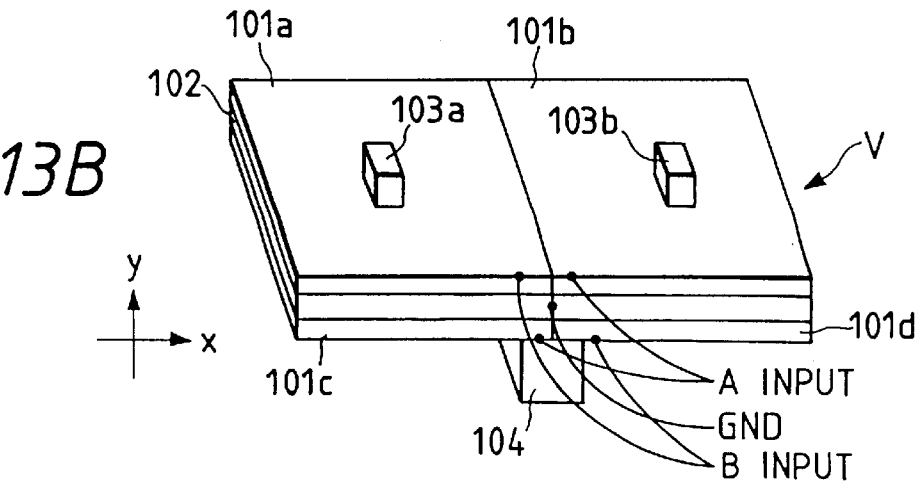

In the third and fourth embodiments described above, each of the piezoelectric elements 111a, 111b, 131a, and 131b for driving has an area ½ that of each piezoelectric element for driving in each mode in the conventional device shown in FIGS. 13A and 13B. For this reason, when these piezoelectric elements are driven by the same voltage, the amplitude of vibrations obtained in the third and fourth embodiments is smaller than that in the conventional device, and hence a great reduction in driving torque occurs. Although a sufficient torque can be obtained by combining the fourth embodiment with the conventional device, extra piezoelectric elements are required.

In this embodiment, similar to the conventional device shown in FIGS. 15A to 15D, piezoelectric elements 141, 142, 144, and 145 for producing vibrations of the L and B modes are bonded to the upper and lower surfaces of a ground electrode plate 143 and are driven by the same scheme as that of the conventional device in FIGS. 15A to 15D. The embodiment is different from the conventional device in that the piezoelectric element 144 is constituted by a piezoelectric element portion 144a for producing driving vibrations of the L and B modes and a piezoelectric element portion 144b for detecting vibrations of a driving piece 140a, and the piezoelectric element 145 is constituted by a piezoelectric element portion 145a for producing driving vibrations of the L and B modes and a piezoelectric element portion 145b for detecting vibrations of a driving piece 140b, as shown in FIG. 12B. More specifically, the deposited electrode formed on the surface of each of the piezoelectric elements 144 and 145 is divided into a driving electrode surface and a detection electrode surface to form a driving piezoelectric element and a vibration detecting piezoelectric element from one piezoelectric member. The vibration detecting piezoelectric element portions 144b and 145b are disposed at positions where they oppose the driving pieces 140a and 140b.

In the third to fifth embodiments described above, by synthesizing bending vibrations of the B mode with longitudinal vibrations of the L mode, each driving piece is caused to perform an elliptic motion, as shown in FIG. 14A.

However, bending vibrations in two orthogonal directions may be synthesized to cause an elliptic motion within a plane of the vibration member.

According to the third to fifth embodiments, even in a vibration member in the form of a flat plate, the vibration state of a motion extraction member such: as a driving piece can be detected, and hence driving control of the vibration member can be performed by using an optimal frequency.

According to the above embodiment, since a driving vibration member can take a large area, the amplitudes of vibrations of two vibration modes for driving can be increased, and the driving torque can be increased. In addition, vibrations of a motion extraction member can be detected without increasing the number of vibration detection elements such as piezoelectric elements.

According to the above embodiment, since vibration detection elements are arranged at positions corresponding to nodes or antinodes of vibrations, vibrations of each motion extraction member can be accurately detected.

According to the above embodiment, only the vibration state of each motion extraction member can be accurately detected.

What is claimed is:

1. A vibration driven actuator comprising:

a plate-like vibration member having a width and including a projection portion having a width less than the width of said plate-like vibration member;

an electro-mechanical energy conversion element formed on one surface of said plate-like vibration member and producing a driving force in said projection portion by generating in the plate-like vibration member specific vibrations obtained by synthesizing bending and longitudinal vibrations in said plate-like vibration member, said projection portion performing a circular or elliptic motion in response to the specific vibrations formed in said plate-like vibration member; and a mechano-electric energy conversion element formed on the other surface of said plate-like vibration member, said mechano-electric energy conversion element generating an output signal representing a vibration state of said plate-like vibration member.

2. An actuator according to claim 1, further comprising a contact member which contacts said projection portion, and wherein said plate-like vibration member and said contact member are moved relative to each other by the driving force of the circular or elliptic motion of said projection portion.

3. An actuator according to claim 1, wherein said mechano-electric energy conversion element is formed on a surface of said plate-like vibration member different from a surface of said plate-like vibration member on which said projection portion is formed.

4. An actuator according to claim 1, wherein a surface area of said mechano-electric energy conversion element on said plate-like vibration member is equal to a surface area of said projection portion on said plate-like vibration member.

5. An actuator according to claim 1, wherein a position of said mechano-electric energy conversion element on said plate-like vibration member is disposed an integer multiple of ½ a wavelength of the specific vibrations away from a position of said projection portion on said plate-like vibration member.

6. An actuator according to claim 5, wherein the position of said projection portion corresponds to a substantially maximum amplitude of the specific vibrations.

7. A vibration driven actuator comprising:

a plate-like vibration member having a width;

electro-mechanical energy conversion elements formed on both surfaces of said plate-like vibration member;

a projection portion formed on a surface of one of said electromechanical energy conversion elements, and having a width less than the width of said plate-like vibration member, said electro-mechanical energy conversion elements producing a driving force in said projection portion by generating in said plate-like vibration member specific vibrations obtained by synthesizing bending and longitudinal vibrations produced in said plate-like vibration member, said projection portion performing a circular or elliptic motion in response to the specific vibrations formed in the plate-like vibration member; and a mechano-electric energy conversion element formed on part of a surface of one of said electromechanical energy conversion elements, said mechano-electric conversion element generating an output signal representing a vibration state of said plate-like vibration member.

8. An actuator according to claim 7, further comprising a contact member which contacts said projection portion, and wherein said plate-like vibration member and said contact member are moved relative to each other by the driving force of the circular or elliptic motion of said projection portion.

9. An actuator according to claim 7, wherein said mechano-electro energy conversion element is formed on a surface of said electro-mechanical energy conversion elements different from a surface of said electro-mechanical energy conversion elements on which said projection portion is formed.

10. An actuator according to claim 7, wherein a surface area of said mechano-electric energy conversion element on said one of said electro-mechanical energy conversion elements is equal to a surface area of said projection portion on said electro-mechanical energy conversion elements.

11. An actuator according to claim 7, wherein a position of said mechano-electric energy conversion element on said electro-mechanical energy conversion elements is disposed an integer multiple of ½ a wavelength of the specific vibrations away from a position of said projection portion on said electro-mechanical energy conversion elements.

12. An actuator according to claim 11, wherein the position of said projection portion corresponds to a substantially maximum amplitude of the specific vibrations.

* * * * *

UNITED STATES PATENT AND TRADEMARK OFFICE
CERTIFICATE OF CORRECTION

PATENT NO. : 5,936,328

DATED : August 10, 1999

INVENTOR(S): HIRONORI TAKANO, ET AL.

It is certified that error appears in the above-identified patent and that said Letters Patent is hereby corrected as shown below:

COLUMN 5,
Line 6, "FIG." should read --FIGS.--.

COLUMN 8,
Line 10, "an" should read --and--; and
Line 23, "having" should read --have--.

COLUMN 9,
Line 6, "such:as" should read --such as--.

Signed and Sealed this

Twenty-eighth Day of March, 2000

Attest:

Q. TODD DICKINSON

Attesting Officer      Commissioner of Patents and Trademarks